United States Patent [19]

Wallin

[11] 4,211,577

[45] Jul. 8, 1980

[54] PROCESS OF PURIFYING PLANT ANTHOCYANIN COLORS

[75] Inventor: Bruce K. Wallin, Sherman, N.Y.

[73] Assignee: Welch Foods Inc., Westfield, N.Y.

[21] Appl. No.: 832,814

[22] Filed: Sep. 13, 1977

[51] Int. Cl.$^2$ .............................................. B01D 31/00
[52] U.S. Cl. ............................ 106/288 Q; 210/23 H; 210/22 R; 426/489; 426/490; 426/495
[58] Field of Search ............................ 106/288 Q, 309; 210/23 F, 23 H, 22, 259, 433 M; 426/250, 490, 495, 489

[56] References Cited

U.S. PATENT DOCUMENTS

| | | | |
|---|---|---|---|
| 3,799,806 | 3/1974 | Madsen | 210/22 |
| 3,896,241 | 7/1975 | Malaspena et al. | 426/491 |
| 3,963,700 | 6/1976 | Philip | 426/489 |
| 4,004,038 | 1/1977 | Wichremasinghe | 210/23 F |
| 4,006,078 | 2/1977 | Bechoff et al. | 210/23 F |
| 4,083,779 | 4/1978 | Combe et al. | 210/433 M |

FOREIGN PATENT DOCUMENTS

| | | | |
|---|---|---|---|
| 50-103526 | 8/1975 | Japan. | |
| 808122 | 1/1959 | United Kingdom | 426/250 |

OTHER PUBLICATIONS

Stavenger, Chemical Engineering Progress, vol. 67, No. 3, pp. 30–36 (Mar. 1971).
Cheroboga et al., Journal of Food Science, vol. 38, pp. 464–467.
Frances, Food Technology, May 1975, pp. 52–53.

*Primary Examiner*—Delbert E. Gantz
*Assistant Examiner*—J. V. Howard
*Attorney, Agent, or Firm*—Dayton R. Stemple, Jr.

[57] ABSTRACT

Extraction of purified plant anthocyanin colors particularly from dark grapes by treating impure materials to insure discrete monomeric anthocyanin molecules in solution and then passing the solution through ultrafiltration membranes to retain soluble and/or cloudy macromolecular, e.g., colloidal, impurities upstream that produce, an aging, haze and sediments, and pass the monomeric anthocyanins downstream for further concentration as liquid or powder to give a stable color concentrate that can be used as a color additive. For example, fruit solids may be treated with sulfur dioxide solutions to ionize, decolor and insure the monomeric state of the pigment molecules (change from anthocyanins to chromon 2-and 4-sulfonates), ultrafiltering the solution to pass the anthocyanins downstream while retaining upstream the macromolecular components such as pectins, tannins, proteins, complexes thereof, etc., optionally stripping the sulfur dioxide from the ultrafiltered solution to regenerate the original anthocyanins from the chromen sulfonates, and thereafter concentrating said anthocyanins by evaporation to a highly concentrated liquid from which unstable pigments with acyl groups in the molecule may optionally be removed by controlled precipitation at reduced temperatures.

Alternatively, the liquid with or without the controlled precipitation may be further concentrated to powder.

26 Claims, 1 Drawing Figure

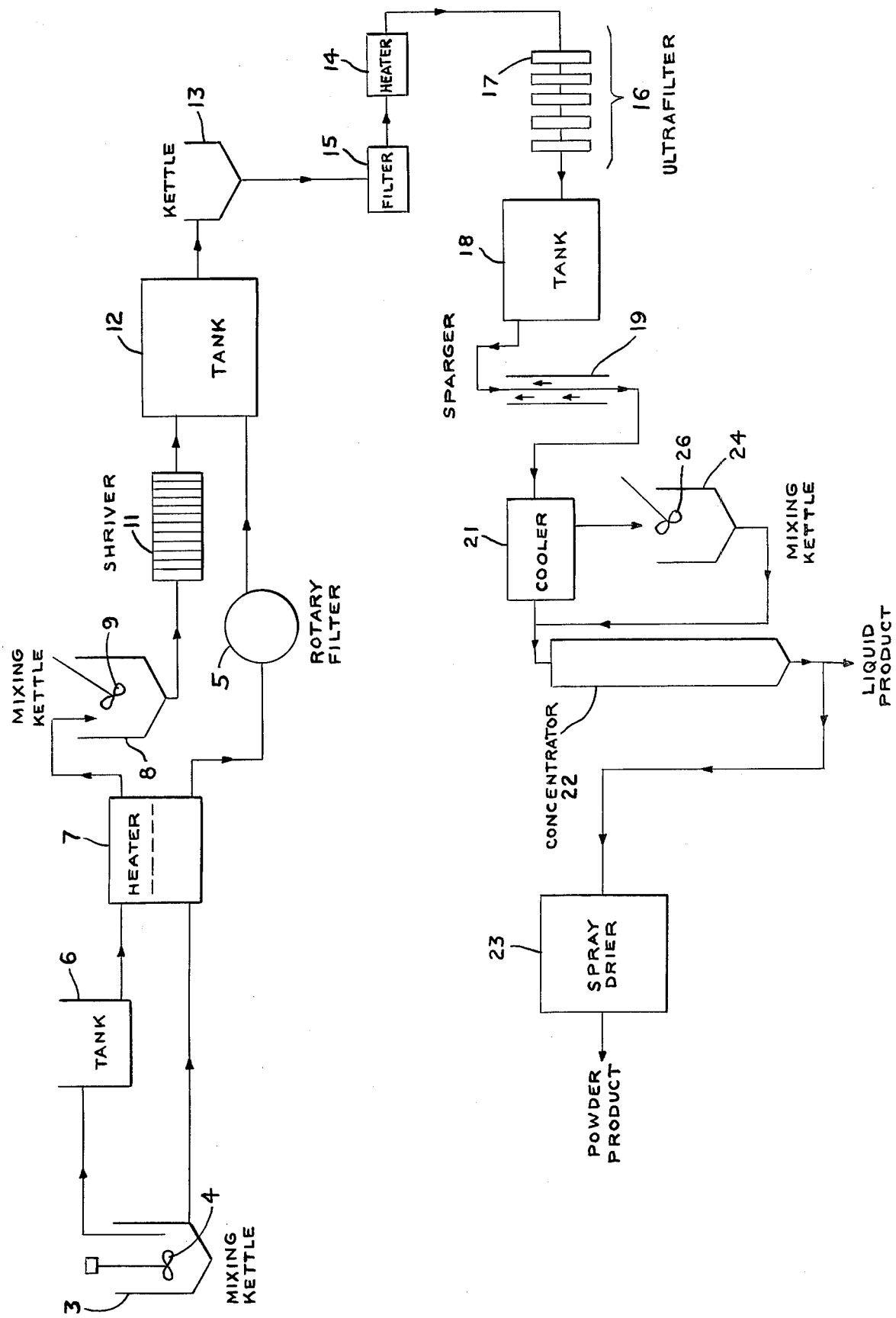

PROCESS OF PURIFYING PLANT ANTHOCYANIN COLORS

BACKGROUND OF THE INVENTION

This invention relates to new and useful processes for producing purified anthocyanin colors from plants particularly dark grapes, including known steps to insure discrete monomeric anthocyanin molecules, e.g. treating with sulfur dioxide to decolor and ionize the anthocyanin molecules, and thereafter to use a novel step of ultrafiltration to pass the monomeric anthocyanins through a membrane that retains colloidal impurities of macro-molecular size that have heretofore tended to create haze in color solutions and produce instability thereof.

PRIOR ART

The anthocyanins are the most important and widespread group of coloring matters in plants. These intensely colored, generally water-soluble pigments are known to be responsible for nearly all the pink, scarlet, red, mauve, violet and blue colors in the petals, leaves and fruits of higher plants.

The anthocyanins appear in the petals of flowers, in the leaves of many plants and in the fruit of colored fruits and vegetables. The anthocyanins of fruit may be solely in the skins (egg plant, apple), throughout the fruit body (cherry, blackberry), or in different and varying amounts in the skin and flesh (grape, plum). Much of the color in grapes, for example, remains in the skin or other solids when the grapes are cold pressed to remove the liquid to be used as juice or for processing into wine or other products. In fact, most of these solids with color therein are discarded as waste products.

Worldwide, progressive restrictions have been applied to the legal use of food colorings, particularly azo dyes and other synthetics, during the past decade. The range of colorings available to the food manufacturer is therefore now greatly restricted and will be even more so in the future. No region of the spectrum has been immune but the choice of reds has possibly been the most affected. The recent banning of Red No. 2 (amaranth) by FDA, and of Orange RN in England and the threats posed to Ponceau 4R, Green S and other dyes in the Common Market have seriously limited the palette available to the food development technologist. The risk that many food products will have to be marketed with a much less attractive appearance has led to an intensified search for and experimental use of natural colors derived from various plants which have the ability to synthesize color compounds, principally anthocyanins.

The greatest tonnage of anthocyanin for use as a natural food color is obtained currently from a few specific dark-skinned varieties of grape. Literally hundreds of sources are known however many of which are reported by Harborne in Comparative Biochemistry of the Flavonoids, 1967 (Academic Press). In removing liquid solutions of anthocyanins from any of these solid sources, there is almost invariably also removed macromolecular components of proteins, pectins, tannins and complexes thereof which heretofore have not been completely separated from the anthocyanins commercially.

It has been known to treat grape slurries or juices with small amounts of sulfur dioxide to restrict the growth of wild yeast naturally found in these products. Greater amounts will inhibit fermentation as shown by Bioletti and Cruess in 1912 (Bulletin No. 230, University of California Publication, "Enological Investigations") and U.S. Pat. No. 3,484,254, the latter showing extraction of color and flavor constituents from grapes and berries.

Enocianina (or enos) are generally produced commercially by a long-term steep of grape solids in a sulfur dioxide solution followed by decantation, cel filtration and concentration of the liquid supernate. These commercial products are extremely variable in color intensity, contain relatively large residual levels of sulfur dioxide, heavy metals, various macromolecular materials such as proteins, tannins, pectins, complexes thereof and acyl anthocyanins which tend to be unstable over longer periods of storage and utilization. Moreover, these enos are not responsive to shifts in pH (which is characteristic of anthocyanin pigments), are not stable, and create instability in the shelf-life of products to which they are added, particularly causing cloudiness in liquid products.

In the processing of grapes there are several pulp substrates or solids known under various terms in the art. When the grapes are subjected to the normal pressing operation, the solids left after pressing out the juice is known as pomace. Sometimes prior to pressing, the grapes are passed through a stemmer-crusher during which stage a certain percentage of the skins are removed by appropriate shaker screens. After the juice is removed, particularly from hot press Concord grapes, it is normally refrigerated at 30° F. to precipitate excess potassium acid tartrate, during which there is a co-precipitation of excess pigments and suspended insoluble fiber and colloidal matter, including tannins, pectins, and protein fragments. After several weeks of such storage, the clear supernatant juice is removed. The remaining solids are known as grape lees. The grape lees may be filtered with the aid of a filter cel on a rotary vacuum filter, leaving solids on the doctor blade, containing relatively high concentrations of pigments which is called filter trim.

Any or all of these and other various solid materials are subject to extraction of color. The solids may contain large portions of color material of the original grapes after the juice has been removed by pressing.

Time is an important consideration. The juice that has been quickly separated from the solids is sediment free at that time. However, during storage, particularly at cooler temperatures, sediments appear (e.g., lees). If sufficient time (perhaps several months) is permitted, most of the undesirable materials will settle out to leave a purer anthocyanin material in the juice (or wine) but time is of course costly.

The chemistry of these materials is based on 2-phenylbenzopyrylium (flavylium) having the following structure:

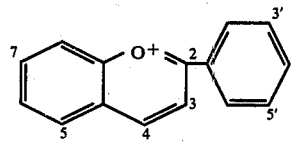

If this basic formula is substituted with hydroxy or methoxy groups at 2, 3, 4, 5, 7, 3' or 5', the resultant compounds are known as anthocyanidins, which are water insoluble, unstable to light and rapidly destroyed by alkali and thus not found too often in plants. However, the glycosides thereof, known as anthocyanins, are more stable and are found as native substances in the leaves, flowers and fruits of plants.

The more common substitution pattern of the anthocyanidins are as follows:

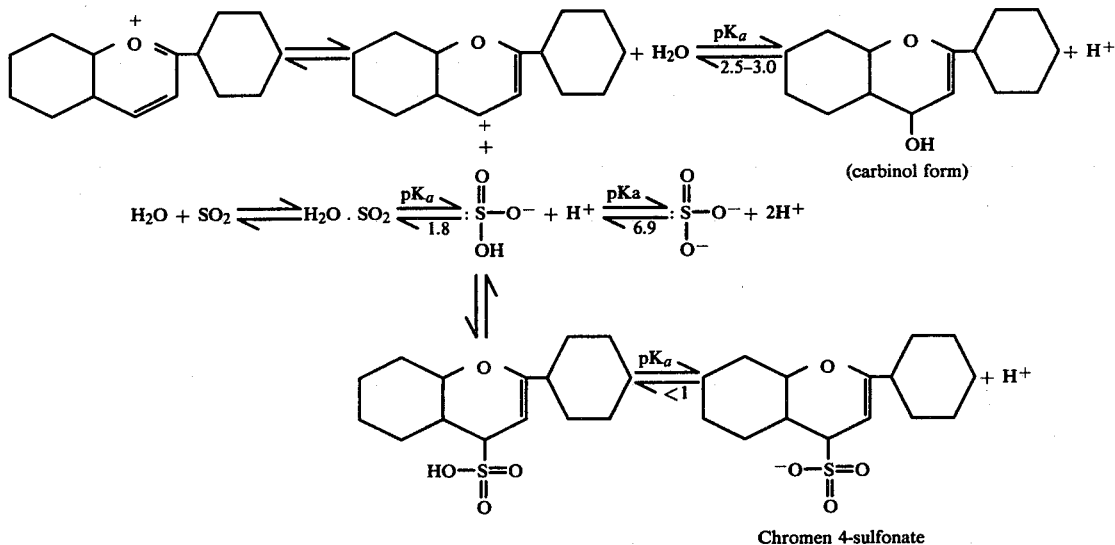

Chromen 4-sulfonate

| Anthocyanidin | | 3' | 5' |
|---|---|---|---|
| Pelargonidin | (Pg) | H | H |
| Cyanidin | (Cy) | OH | H |
| Delphinidin | (Dp) | OH | OH |
| Petunidin | (Pt) | $OCH_3$ | OH |
| Peonidin | (Pn) | $OCH_3$ | H |
| Malvidin | (Mv) | $OCH_3$ | $OCH_3$ |

3' is generally methylated before 5'. The glycosides first substitute at 3, then 3,5 and rarely 3, 5, 7 for a trisaccharide.

The total number of anthocyanins found in nature is extremely large, since many mono, di and tri-saccharides may be glycosylated at the 3, 5 or 7 positions and also since the sugar at position 3 may be acylated (often with p-coumaric acid). Thus, Concord grapes, a Vitis labrusca hybrid from the eastern United States contains 20 identified anthocyanins—the 3,5-diglucosides, the 3-monoglucosides, the 3-(6-0-p-coumaryl-glucoside)-5-glucosides and the 3-(6-0-p-coumaryl-glucoside) of Cy, Dp, Pt, Pn and Mv. The color of anthocyanins is determined by their molecular structure and the physiochemical nature of the medium in which they are present.

Increasing numbers of hydroxyl groups change the color from pink to blue. Methoxyl groups reverse this trend. Methoxyl groups also stabilize the molecule as does the increasing degree of glycosylation, whereas acylation destabilizes the anthocyanin. Thus, malvidin 3,5-diglucoside is one of the most stable of anthocyanins.

These pigments demonstrate a typical red colour in acidic aqueous solutions with an absorbancy maximum in the region of 520 nm. Absorbancy in the visible range can be attributed to $\pi$ electron dispersion through $sp^2$ orbitals of carbons 2, 3, 4 and the oxonium ion. The resonating allylic system between carbons 2, 3 and 4 can give rise to the carbonium structures (C-2 and C-4 carbonium ion). The carbonium forms can react with various nucleophiles resulting in interruption of $\pi$ conjugation and loss of 520 nm absorbancy. A most significant example, the reaction between C-4 carbonium ion and water is shown; there is a similar reaction of the C-2 carbonium ion to yield the corresponding base.

The release of a proton in the reaction with water readily explains pH dependency with anthocyanins demonstrating a $pK_a$ in the range of 2.5–3.0.

Further chemistry of the anthocyanins and their distribution in grapes are shown by the earlier referenced Harborne, and Hrazdina and Franzese, Phytochemistry, 1974, Vol. 13, pp 225–229 (Pergamon Press) and P. Markakis, CRC Critical Reviews in Food Technology, 1974, Vol. 4, pp 437–456.

SUMMARY OF INVENTION

I have found that a solution containing both discrete monomeric anthocyanin molecules and soluble macromolecules such as proteins, pectins, tannins, complexes thereof, etc., can be selectively filtered by ultrafiltration with an appropriate membrane to pass the anthocyanins and retain the larger components. One way to maintain the anthocyanins in monomeric form suitable for ultrafiltration is to extract same from their source by sulfur dioxide solution. The extract is separated from the solids by conventional filtration. After the ultrafiltration, the downstream product is stripped of $SO_2$ to generate the original anthocyanins thus yielding an extract (liquid or powder) of consistently high color intensity, which is stable at 0° C. for at least one year, and which when used in final products, such as drinks, puddings, frozen desserts, etc., will remain color stable over the shelf-life of the product and will retain clarity for that period of time without leading to haze or sediment in liquids. Because of the consistent color intensity of the concentrate or powder, finished products such as beverages and gelatin desserts may be made in any range of hue from strawberry-red through grape purple-red. Various optional steps are available, both before and after the ultrafiltration to remove various impure materials and particularly after the ultrafiltration to remove the more unstable acyl anthocyanin products which may be present.

Therefore, it is the primary object of this invention to separate anthocyanins from materials of larger molecular size.

It is an added object to produce a relatively purified anthocyanin pigment from fresh raw material.

It is a further object to produce a liquid or powder material that is stable at 0° C. for at least one year.

It is another object to produce a material that will remain color stable over the shelf-life of the product to which it has been added.

It is also an object to produce a color extract that will retain clarity over the shelf-life of liquid products without forming haze or sediment therein.

It is an additional object to have consistent natural color concentrates ranging in hue from strawberry-red through grape purple-red.

It is a further object to optionally utilize sulfur dioxide solutions of anthocyanin for ultrafiltration to filter out colloidal impurities.

With these and other objects in view, the nature of which will be apparent, the invention will be more fully understood by reference to the drawings, the accompanying detailed description, and the appended claims.

BRIEF DESCRIPTION OF THE DRAWINGS

FIG. 1 is a flow diagram of the process with various optional steps to produce liquid or powder anthocyanin extract.

DETAILED DESCRIPTION

This invention as illustrated in the flow diagram shows the process as directed toward extraction of grape color. Other source examples are shown and the process is obviously applicable to anthocyanins whenever they occur in plants since there must always be a gross separation from solid plant materials and a subsequent separation from macromolecular materials such as proteins, tannins, pectins, complexes thereof and similar materials.

EXAMPLE 1

Draw approximately 2500 gallons of cold water into batching kettle 3. During intermittent agitation with stirrer 4, inject 40 lbs. of $SO_2$ gas through a stop cock into the kettle. Then add 5000 lbs. of filter trim and bring the volume to 3000 gallons with cold water. To this mixture is added 3 lbs. of Scott Labs cold-mix Sparkolloid (active ingredient is agar-agar), agitate for ten minutes and then allow to settle for a period of 16–20 hours. Before settling, the $SO_2$ content of the slurry should be between 1,000 and 2,000 ppm. After the solid materials have settled the top 75% or 2250 gallons is decanted by standpipe or siphoning to storage tank 6.

1000 gallons of decant is then passed through heater 7 to reach a temperature of 120°–140° F. and fed to kettle 8. At this point an analysis for $SO_2$ is run, and more $SO_2$ is added if needed to bring the content up to 1,000–1,500 ppm (add 1 lb. gas per 100 ppm needed). Add approximately 500 lbs. of J.M. 503 (or equivalent filter aid). The resultant slurry is passed through a Shriver filter 11 precoated with approximately 200 gallons water and 4.5 pounds of Celluflo-0 (diatomaceous earth, as is J.M. 503). The mixture is recirculated until the filtrate is clear and then pumped to storage tank 12.

Instead of settling and decanting, the slurry can be continuously mixed and pumped to heater 7. The warm slurry is then filtered on a rotary vacuum precoat filter 5 coated with J.M. 503 filter aid or equivalent and then passed to storage tank 12.

The filtrate from the Shriver or the rotary vacuum is pumped to the ultra-filter reserve kettle 13, then passes through safety filter 15, and on to heater 14 to reach a temperature of 100±5° F. and then to the ultrafiltration unit 16 which is a Romicon model HF20S which is equipped with a plurality of type XM50 cartridges 17 and set for an inlet pressure of 25 psi and an outlet pressure 10 psi.

The ultrafiltration is operated optionally at about 100° F. although it can range from 45 to 110° F. Below 95° F. the output rate is considerably reduced and above 105° F., the membrane cartridge life is considerably reduced.

When the rate of permeate production falls to 4 gallons per minute the filtration is stopped by first terminating feed to the feed kettle, waiting until the kettle content is reduced to about 50–80 gallons and then turning off the pump. Thereafter the material in the feed kettle is discarded, the membrane cartridges are regenerated by conventional cleaning and then the operation started again. During operation the incoming and outgoing material is monitored for product concentration.

The permeate from the ultrafiltration is passed to storage tank 18 or directly to the stream sparge unit 19 for stripping of the $SO_2$. In this unit, steam is passed upwardly through columns and the permeate is passed downwardly whereby the $SO_2$ is purged from the solution. $SO_2$ is removed primarily to avoid its corrosive effect in subsequent steps. If it were retained to the respective end products of liquid or concentrate powder, the end product could still be used as a conventional color additive because the $SO_2$ would be diluted by the addition to levels that create no problems.

The permeate is then cooled in an APV exchanger 21 to 140±10° F. and then passed to a concentrator 22 where it is concentrated 5 to 10 fold under vacuum at 140 to 150° F. Malto-dextrin or other suitable carrier is added to the warm concentrate so as to provide a ratio of fruit solids to carrier solids of 0.66 or less. The precise ratio of fruit solids to carrier solids is adjusted to insure uniform color density of the finished products. A carrier is desirable because otherwise the product is hydroscopic. The warm mix is fed to a spray dryer 23 at inlet temperature 390°–450° F. and outlet temperature 220° F. Thereafter the material is packaged or placed in drums for shipment to food processors.

If it is desired to make a liquid product, citric acid is added to the stripped permeate from cooler 21 in an amount equal to 10 times the anthocyanin content by weight of the solution. Thus, 100 pounds of stripped permeate containing 0.1% anthocyanin pigment will have added 10 pounds of citric acid which is thoroughly mixed at kettle 24 with stirrer 26. The material is then fed to concentrator 22 where it is concentrated at 140°–150° F. under vacuum until sufficient water has been removed to yield a final concentrate containing 1.0% anthocyanin pigment by weight.

The dark colored grapes including Concord may have a mixture of any of 20 individual anthocyanin pigments, some of which contain acyl groups esterified on the 3 glucoside portion of the molecule. These pigments are somewhat more unstable than those without acyl groups and may on occasion cause sediment when used in a final drink product.

I have found that if the liquid concentrate is stored at 28° to 38° F. for at least 2 days at a pH of 2.2±0.2, about 5% of the total pigment will precipitate out which appears to be the less stable acyl anthocyanins. Maximum precipitation generally occurs at 5 to 7 days but storage can last for several weeks. If the pH is too low these less soluble pigments will not precipitate and if the pH is too high some of the more soluble pigments will come down resulting in a loss of color from the final product. This is an optional step therefore of using this controlled precipitation in the production of a liquid concentrate. The precipitate is separated by conventional decanting, siphoning or filtration. In producing a dry powder, I have not found that any unstable pigment causes any difficulty when added to food products.

EXAMPLE 2

Grape skins taken from the shaker screens are pressed to remove excess free-run juice. The skins are then extracted with 2 to 5 volumes of 1000–1200 ppm $SO_2$ solution for 2–6 hours of slow mixing. The skins are permitted to settle and the extract decanted. The skins are pressed and the further extract added to the decantate. The total decant is then treated as in Example 1, starting at heater 7.

EXAMPLE 3

Grape pomace, after normal pressing operation is extracted with 3 to 6 volumes of 1000–1200 ppm $SO_2$ solution and treated in the same manner as described in Example 2 for skins.

EXAMPLE 4

Grape lees (after several weeks of storage and removal of supernatant juice) is extracted with 2 to 4 volumes of 1000–1200 ppm $SO_2$ solution and treated in the same manner as described in Example 2 for skins.

EXAMPLE 5

10 pounds of whole cranberries were crushed in water. Thereafter the slurry was made up to a total weight of 60 pounds with water, $SO_2$ to a concentration of 1200 ppm, and Sparkolloid to 100 ppm. The slurry was steeped for 6 hours at room temperature and the solids separated on a shaker screen. The extract was then filtered on a Buchner filter with J.M. 503 cel. The filtrate was then passed through an ultrafilter with 35 Å mean pore diameter. At wavelength of 520 nm the retentate showed 6.0 color units at pH 1.5 and the permeate had 5.7 color units for a 95% color recovery. The permeate was concentrated to 5:1 on a Wall unit to give a concentrate having 28.5 color units. This concentrate was diluted into samples of 3 and 10 color units which gave no chill haze on refrigeration and storage.

EXAMPLE 6

12.5 pounds of blackberries were pureed in water to 40 pounds total, supplemented to 1200 ppm $SO_2$ and 100 ppm Sparkolloid and steeped for 6 hours at room temperature. The slurry was centrifuged to remove solids and the supernate filtered through a Buchner with J.M. 503 cel. The filtrate was then ultrafiltered on 35 Å mean pore diameter membrane. The retentate showed 35.5 color units of which 34.5 were recovered in the permeate for 97% recovery. Citric acid was added to the permeate on a 10 to 1 acid to anthocyanin weight basis and the material then concentrated to 238 color units. Dilutions of this concentrate at 3 and 10 color units show no chill haze on refrigeration and storage.

GENERAL INFORMATION

Other means of pigment extraction may be utilized, e.g., water alone, organic solvents such as ethanol, with or without acids, or acids other than $SO_2$, such as phosphoric, hydrochloric, citric, sulfuric, malic, tartaric, etc. The anthocyanins however tend to sandwich or reversably polymerize if concentration in plain water is above 0.02%. Organic solvents generally dissolve or damage the plastic ultrafiltration membranes, thus requiring expensive replacement thereof. At low enough pH and concentration, e.g., 0.05–0.1% anthocyanins at pH 1.5–2.5, the pigments remain discrete but even so do not form the more soluble chromen-sulfonate which by its ionization always remains discrete from the molecules and readily passes through the appropriate size membrane without difficulty. Therefore, $SO_2$ solution is the solvent of choice for the ultrafiltration, although other solvents are workable but less effective.

If the pigment is extracted with aqueous solutions other than $SO_2$, it would generally be preferred to add $SO_2$ prior to the ultrafiltration step. If the pigment is extracted with organic solvent, it would be generally preferred to remove the solvent and add an appropriate amount of $SO_2$ solution. It is also possible to start with conventional liquid solutions of anthocyanins as source material, e.g., juices, wines, brandies, etc., as long as they contain a mixture of anthocyanins and macromolecular materials.

Treatment with filter aids, flocculating agents and cel filtration makes ultrafiltration far more efficient by significantly increasing the rate at which the extracts can be passed through the ultrafiltration system. Thus, various such materials can be used, e.g., gelatin at 200–750 ppm instead of agar-agar. The major effect of ultrafiltration is the removal of components responsible for chill haze and heavy sediments found present in the extract which has not been subject to this treatment. Substances of sufficiently small size, such as discrete anthocyanins, chromen-sulfonates, sulfur dioxide, glucose, fructose, tartrates, K+, Fe, and Cu readily pass the membranes and appear in the permeate at concentrations equivalent to the initial process stream. Thus, ultrafiltration of the extract removes the last of those colloidal components which usually generate chill hazes and heavy sediment when the color concentrate is used as a colorant in clear products. This is accomplished without sacrificing any pigment yield.

The pore size of the membrane through the ultrafiltration range of 10–50 Å is workable. It has been found that large pore diameters, for example, above 50 Å are ineffective and do not eliminate much of the haze in final products made with the color product. If pore diameter is too small, i.e., below 10 or 15 Å the processing rate is slowed down significantly without any improvement in the quality of the color. About 35 or a range of 30–40 Å is preferable.

The level of sulfur dioxide in the filtrate must be carefully monitored and maintained between 500 to 2000 ppm during ultrafiltration to insure quantitative transfer of color across the ultrafilter membrane. Attempts to ultrafilter at sulfur dioxide concentrations between 500–750 ppm can result in reduced color transfer, due to the solubility characteristics of free anthocyanin pigments as compared with chromen sulfonates. The lowered solubility of the former results in co-pigmentation and/or adsorption to macromolecules present in the process fluid. By co-pigmentation is meant a non-covalent polymerization of anthocyanins with each other. This phenomenon results in pigment bodies of significantly increased size which therefore will not cross the ultrafiltration membrane. In effect, this means there will be a net loss of color in the final product, while there will be an increased color level in the waste product. At above 2000 ppm, the pigment can be destroyed. Better results are obtained at 750–1800 and preferably at 1000–1200 ppm.

The effectiveness of ultrafiltration by the described process is readily demonstrated by analysis of turbidity of solutions containing color product at levels which will provide typical appearance of red to purple fruit products.

The final recovered pigments may be used as conventional color additives in liquids such as juices, wines, liquers, soft drinks, etc., gelatins, frozen foods, yogurts, fondants, fruit spreads, baker's products, candies, pharmaceuticals, cosmetics and other items too numerous to mention in ranges of 0.5 to 4% or otherwise as necessary to produce the desired color.

The final products from Example 1 will generally have less than 200 and 500 ppm of $SO_2$ in the liquid and powder respectively, which will of course be further diluted by addition of the material to be colored so that the $SO_2$ becomes of negligible effect. The powder may be up to 40% fruit solids (60% carrier) of which 4 to 5% is pigment.

I claim:

1. In a process for separating anthocyanin components from macromolecular components such as proteins, tannins, pectins and complexes thereof, the improvement comprising ultrafiltering a 500 to 2,000 ppm sulfur dioxide aqueous solution of said components through a membrane that passes said anthocyanins and retains said macromolecular components, whereby said anthocyanins are maintained in a discrete monomeric state in said sulfur dioxide solution and substantially separated from said macromolecular components in a single step process.

2. The process of claim 1 wherein said mixture is in an aqueous solution of 750 to 1800 ppm of sulfur dioxide.

3. The process of claim 2 wherein said mixture is in an aqueous solution of 1000 to 1200 ppm of sulfur dioxide.

4. The process of claim 1 wherein the pore size of said membrane is about 10 to 50 Å.

5. The process of claim 2 wherein the pore size of said membrane is about 30 to 40 Å.

6. The process of claim 1 wherein said mixture is extracted from blackberries.

7. The process of claim 1 wherein said mixture is extracted from cranberries.

8. The process of claim 1 wherein said mixture is extracted from dark skinned grapes.

9. The process of claim 8 wherein said mixture is extracted from skins.

10. The process of claim 8 wherein said mixture is extracted from pomace.

11. The process of claim 8 wherein said mixture is extracted from lees.

12. The process of claim 8 wherein said mixture is extracted from filter trim.

13. The process of claim 8 additionally comprising, prior to said ultrafiltration, separating the grape juice from grape solids, extracting pigment from said solids with said $SO_2$ solution, adding filter aid to said extract, and separating said filter aid and combined impurities from said extract, and after said ultrafiltration, further concentrating the pigment in the ultrafiltrate.

14. The process of claim 13 additionally comprising removing $SO_2$ from the ultrafiltrate before concentrating same.

15. The process of claim 14 wherein said $SO_2$ is removed from said ultrafiltrate by passing steam countercurrently to said ultrafiltrate.

16. The process of claim 14 wherein said filter aid is a diatomaceous earth.

17. The process of claim 14 wherein said filter aid is a flocculating agent.

18. The process of claim 14 wherein said filter aid is an agar-agar.

19. The process of claim 14 wherein said concentrated pigment is dried to a powder.

20. The process of claim 19 wherein a carrier is added to said concentrated pigment before drying.

21. The process of claim 20 wherein said carrier is sufficient malto-dextrin to provide 60% by weight of the ultimate powder.

22. The process of claim 14 additionally comprising storing said pigment concentrate for at least 2 days at 28° to 38° F. at a pH of 2.0 to 2.4 and separating the resulting precipitate from the concentrate.

23. The process of claim 22 wherein said storage is for 2 to 7 days.

24. The process of claim 14 additionally comprising adding citric acid to said ultrafiltrate after removal of said $SO_2$.

25. The process of claim 24 wherein said citric acid is added at about 10 times the weight of anthocyanins in said ultrafiltrate.

26. The process of claim 24 wherein said citric acid is sufficient to maintain the ultimate liquid concentrate at pH velow 2.4.

* * * * *

UNITED STATES PATENT AND TRADEMARK OFFICE
CERTIFICATE OF CORRECTION

PATENT NO. : 4,211,577
DATED : July 8, 1980
INVENTOR(S) : Bruce K. Wallin

It is certified that error appears in the above—identified patent and that said Letters Patent is hereby corrected as shown below:

IN OTHER PUBLICATIONS

"Cheroboga" should read -- Chiriboga --.
After "464-467", insert -- (1973) --.
"Frances" should read -- Francis --.

IN THE ABSTRACT

Line 7, "an" should read -- on --.
Line 14, "chromon 2-and 4-sulfonates" should read
         -- chromen 2- or 4-sulfonates --.

IN THE SPECIFICATION

Col. 4, line 50, "is" should read -- in --.
Col. 9, line 23, "0.5" should read -- 0.05 --.
Col. 10, line 53, "velow" should read -- below --.

Signed and Sealed this

Twentieth Day of January 1981

[SEAL]

Attest:

RENE D. TEGTMEYER

Attesting Officer

Acting Commissioner of Patents and Trademarks